United States Patent
Jeong et al.

(10) Patent No.: US 12,481,817 B2
(45) Date of Patent: Nov. 25, 2025

(54) METHOD AND APPARATUS FOR GENERATING IMAGE FILE

(71) Applicant: Samsung Electronics Co., Ltd., Gyeonggi-do (KR)

(72) Inventors: Jin-Hong Jeong, Gyeonggi-do (KR); Sun-Kee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/527,611

(22) Filed: Dec. 4, 2023

(65) Prior Publication Data

US 2024/0152682 A1 May 9, 2024

Related U.S. Application Data

(63) Continuation of application No. 17/091,110, filed on Nov. 6, 2020, now Pat. No. 11,836,436, which is a continuation of application No. 14/287,710, filed on May 27, 2014, now abandoned.

(30) Foreign Application Priority Data

Jun. 28, 2013 (KR) .......................... 10-2013-0075697

(51) Int. Cl.
| | |
|---|---|
| G06F 17/00 | (2019.01) |
| G06F 40/103 | (2020.01) |
| G06F 40/106 | (2020.01) |
| H04N 1/32 | (2006.01) |

(52) U.S. Cl.
CPC .......... *G06F 40/103* (2020.01); *G06F 40/106* (2020.01); *H04N 1/32363* (2013.01); *H04N 2201/3288* (2013.01)

(58) Field of Classification Search
CPC .. G06F 40/103; G06F 40/106; H04N 1/32363
See application file for complete search history.

(56) References Cited

U.S. PATENT DOCUMENTS

| | | | |
|---|---|---|---|
| 5,577,173 A | 11/1996 | Dennis et al. | |
| 7,634,056 B2 | 12/2009 | Graumann et al. | |
| 10,108,584 B2 * | 10/2018 | Song ................. | G06F 3/1284 |
| 10,447,761 B2 | 10/2019 | Eschback et al. | |
| 2005/0001848 A1 | 1/2005 | Colavin | |

(Continued)

FOREIGN PATENT DOCUMENTS

| | | |
|---|---|---|
| EP | 2 202 630 A2 | 6/2010 |
| EP | 2 557 770 A2 | 2/2013 |

(Continued)

OTHER PUBLICATIONS

"A New Method to Capture the Large Bitmap on GUI", The IP.com Journal, Dec. 6, 2013, (Year: 2013).*

(Continued)

*Primary Examiner* — Mohammed H Zuberi
(74) *Attorney, Agent, or Firm* — Cha & Reiter, LLC

(57) ABSTRACT

A method of generating an image file includes providing an electronic page through an electronic device; acquiring a plurality of images including at least a portion of the electronic page based on a user's input; and generating an image file including at least a first image and a second image of the plurality of images.

17 Claims, 19 Drawing Sheets

(56) References Cited

U.S. PATENT DOCUMENTS

| | | |
|---|---|---|
| 2007/0025723 A1 | 2/2007 | Baudish et al. |
| 2007/0247663 A1 | 10/2007 | Huang et al. |
| 2008/0184128 A1 | 7/2008 | Swenson et al. |
| 2008/0201666 A1 | 8/2008 | Park et al. |
| 2008/0240613 A1 | 10/2008 | Dietz et al. |
| 2008/0282160 A1 | 11/2008 | Tonnison et al. |
| 2009/0040291 A1 | 2/2009 | McCall et al. |
| 2009/0083710 A1 | 3/2009 | Best et al. |
| 2011/0221766 A1* | 9/2011 | Ko .................. G06T 11/60 715/785 |
| 2012/0044137 A1* | 2/2012 | Oddiraju .............. G09G 5/395 345/530 |
| 2012/0154520 A1 | 6/2012 | Putraya et al. |
| 2012/0162246 A1* | 6/2012 | Kinarti ............... G06V 10/235 345/619 |
| 2012/0188271 A1 | 7/2012 | Kim |
| 2012/0288190 A1 | 11/2012 | Tang |
| 2013/0100463 A1 | 4/2013 | Park et al. |
| 2013/0198641 A1 | 8/2013 | Brownlow et al. |
| 2014/0214593 A1 | 7/2014 | Craycraft |
| 2015/0067498 A1 | 3/2015 | Satou et al. |

FOREIGN PATENT DOCUMENTS

| | | |
|---|---|---|
| EP | 2 584 454 A2 | 4/2013 |
| KR | 10-2006-0057051 A | 5/2006 |
| KR | 10-2008-0050068 A | 6/2008 |
| KR | 10-2012-0084861 A | 7/2012 |
| KR | 10-2013-0044075 A | 5/2013 |
| WO | 2007/021318 A1 | 2/2007 |
| WO | WO-2017032189 A1 * | 3/2017 |

OTHER PUBLICATIONS

Korean Search Report dated Jul. 9, 2019.
European Office Action dated Apr. 3, 2023.

* cited by examiner

METHOD AND APPARATUS FOR GENERATING IMAGE FILE

CROSS REFERENCE TO RELATED APPLICATIONS

This application is a Continuation of U.S. patent application Ser. No. 17/091,110 filed on Nov. 6, 2020 and assigned U.S. Pat. No. 11,836,436 issued on Dec. 5, 2023, which is a Continuation of U.S. patent application Ser. No. 14/287,710 filed on May 27, 2014 which claims the priority under 35 U.S.C. § 119(a) from Korean Application Serial No. 10-2013-0075697 filed in the Korean Intellectual Property Office on Jun. 28, 2013 the entire content of which is hereby incorporated by reference.

BACKGROUND

1. Technical Field

The present disclosure relates to a method and an apparatus for generating an image file.

2. Description of the Related Art

According to the development of information communication technologies, various user devices such as a smart phone and the like have been widely supplied. Various applications for web browsing and an electronic book are installed in such user devices for user's convenience.

In one example, due to the development of networks, countless information exchanges are made between user devices or the user device and a server, and users use a method of capturing an image displayed on the user device and transmitting the captured image to share the information.

SUMMARY

When a user desires to capture a page which cannot be shown to one screen, for example, a page of which an entire content can be shown only after a scroll is performed and to transmit the capture page to a counterpart, the user is required to generate a plurality of image files. It will be described with reference to FIGS. 1A to 1B. FIGS. 1A and 1B illustrate an example describing an image file generating method according to a related art. As illustrated in FIG. 1A, when the user desires to capture a page 120 which cannot be viewed through one screen 110, the user is required to capture a page area displayed on the current screen 110. Further, the user should repeatedly capture a next page area by performing a function of a scroll or the like. In this case, a new image file is generated whenever the capture is performed, and thus a plurality of image files 130 are generated as illustrated in FIG. 1B.

According to the related art, it is difficult to manage an image file and there is cumbersomeness of selecting each of the image files in transmitting the image files to the counterpart.

Various embodiments of the present disclosure provide a method of generating pieces of information provided to a user device as one image file.

In accordance with an aspect of the present disclosure, a method of generating an image file is provided. The method includes: providing an electronic page through an electronic device; acquiring a plurality of images including at least a portion (or a part) of the electronic page based on a user's input; and generating an image file including at least a first image and a second image of the plurality of images.

In accordance with another aspect of the present disclosure, a method of generating an image file is provided. The method includes: generating a first capture image by performing a screen capture when there is a screen capture request; generating an $N^{th}$ capture image (N is a natural number larger than 1) by performing a new screen capture corresponding to a new screen capture request when there is the corresponding new screen capture request; and generating one image file by combining at least a portion of the first to $N^{th}$ capture images.

In accordance with another aspect of the present disclosure, a method of generating an image file is provide. The method includes: generating a first capture image by performing a screen capture when there is a scroll capture request; generating an $N^{th}$ capture image (N is a natural number larger than 1) by capturing an area newly displayed in accordance with a scroll; and generating one image file by combining at least a portion of the first to $N^{th}$ capture images.

In accordance with another aspect of the present disclosure, an apparatus for generating an image file is provided. The apparatus includes: a display unit that displays an electronic page; and a controller that controls the display unit to display the electronic page, acquires a plurality of images including at least a portion of the electronic page based on a user's input, and generates an image file including at least a first image and a second image of the plurality of images.

In accordance with another aspect of the present disclosure, an apparatus for generating an image file is provided. The apparatus includes: a display unit that displays an electronic page; and a controller that generates a first capture image by performing a screen capture when there is a screen capture request, generates an $N^{th}$ capture image (N is a natural number larger than 1) by performing a new screen capture corresponding to a new screen capture request when there is the corresponding new screen capture request, and generates one image file by combining at least a portion of the first to $N^{th}$ capture images.

In accordance with another aspect of the present disclosure, an apparatus for generating an image file is provided. The apparatus includes: a display unit that displays an electronic page; and a controller that generates a first capture image by performing a screen capture when there is a scroll capture request, generates an $N^{th}$ capture image (N is a natural number larger than 1) by capturing an area newly displayed in accordance with a scroll, and generates one image file by combining at least a portion of the first to $N^{th}$ capture images.

According to various embodiments of the present disclosure, the user can easily generate information through the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

In the following description of various embodiments of the present disclosure, a detailed description of known functions and configurations incorporated herein will be omitted when it may make the subject matter of the present disclosure rather unclear.

Hereinafter, various embodiments of the present disclosure will be described with reference to the accompanying drawings.

Figure 1A:
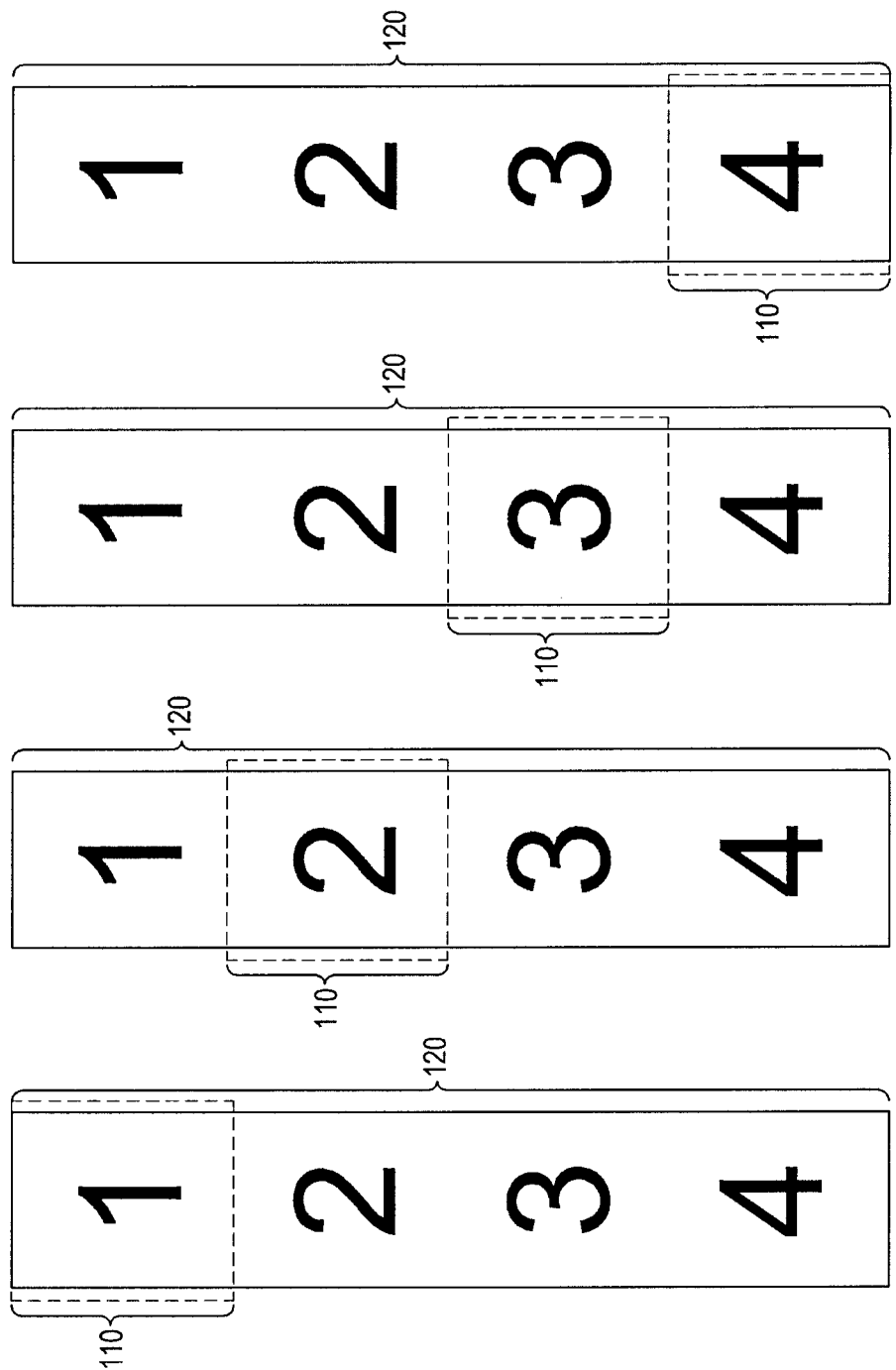
FIG. 1A and FIG. 1B illustrate an image file generating method according to a related art.
Figure 1B:
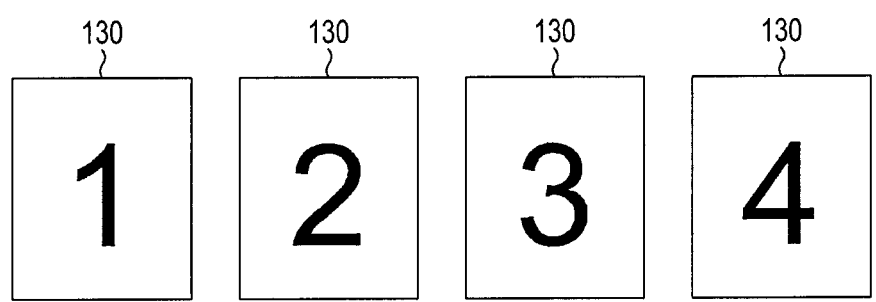
Figure 2:
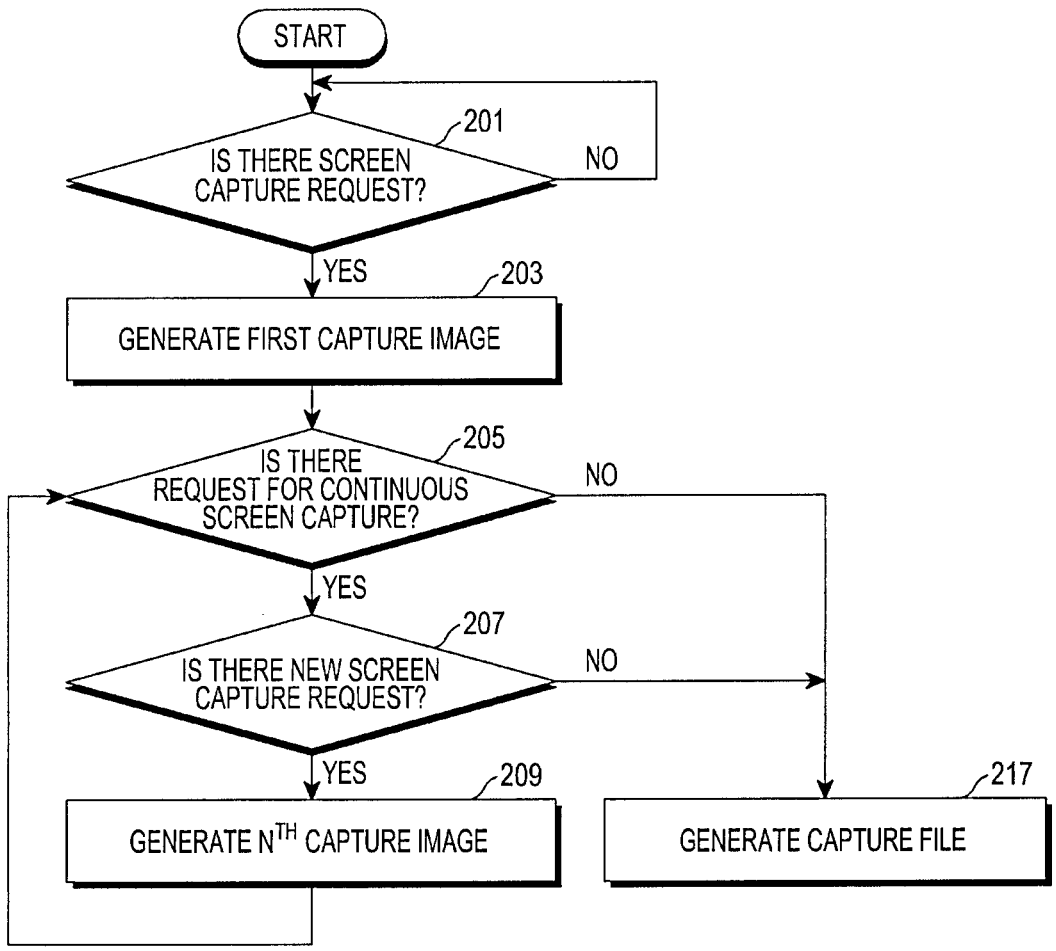
FIG. 2 illustrates an image file generating method according to various embodiments of the present disclosure.

FIG. 2 illustrates an image file generating method according to various embodiments of the present disclosure.

The processing device (eg., user device) determines whether there is a screen capture request from the user in step 201, and proceeds to step 203 when there is the screen capture request.

The user device captures a screen to generate a first capture image in step 203, and then proceeds to step 205. According to an embodiment, the screen capture may be performed for an entire display area or a set display area. For example, the case where the screen capture is performed for the entire display area may refer to a case where the screen capture is performed for the remaining display area except for an indicator bar part showing antenna receiving sensitivity, battery remainder, and current time. Alternatively, the case may refer to a case where the screen capture is performed for the remaining display area except for an area displaying a key to which a return function to a home screen or a back function is assigned. The generated capture image may be stored in a predetermined memory space (for example, canvas).

In step 205, the user device determines whether there is a request for a continuous screen capture. When it is determined that there is the request for the continuous screen capture, the user device proceeds to step 207. When it is determined that there is no request for the continuous screen capture, the user device proceeds to step 217. A new screen capture request comprises a request for generating a new capture image to be combined with a previously generated capture image. For example, the new screen capture request is a request for generating a capture image for an area including parts which have not been previously captured, by performing a scrolling function when a long page is viewed on a web browser. A page may comprise a plurality of pages, or a page provided by one or more programs.

In step 207, the user device determines whether there is a new screen capture request. When it is determined that there is the new screen capture request, the user device proceeds to step 209. Otherwise, the user device proceeds to step 217. The new screen capture request refers to a request for generating a new capture image to be combined with the previously generated capture image. For example, the new screen capture request may be a request for generating a capture image for an area including parts which have not been previously captured, by performing a scroll function when a long page is viewed on a web browser. In one embodiment, the page includes a plurality of pages. Alternatively, the page may include a page provided by a plurality of programs. Alternatively, the page may include a page provided by one program.

The user device generates an $N^{th}$ capture image in step 209, and then proceeds to step 205. For example, the user device performs a new screen capture corresponding to the new screen capture request to generate a capture image in step 209. N is a natural number larger than or equal to 2.

In one example, in step 217 performed by the determination that there is no request for the continuous screen capture or the determination that there is no new screen capture request after the determination of step 205, the user device may generate an image file. When the number of generated capture images is one, the user device may generate the image file by using the one capture image. Alternatively, when a plurality of capture images are generated according to a plurality of screen capture requests, the user device may generate one or more image files by combining the plurality of capture images.

According to the above described embodiment, when information that is provided by the user device but cannot be all displayed on a screen of the user device is searched for, desired parts are captured and the captured images are combined, thereby creating a file.

In the above description, the image file generating method according to various embodiments has been discussed with reference to FIG. 2. Hereinafter, an image file generating method according to various embodiments of the present disclosure will be described with reference to related drawings.

FIGS. 3A to 3H illustrate an image file generating method according to various embodiments of the present disclosure.

Figures 3A, 3B:
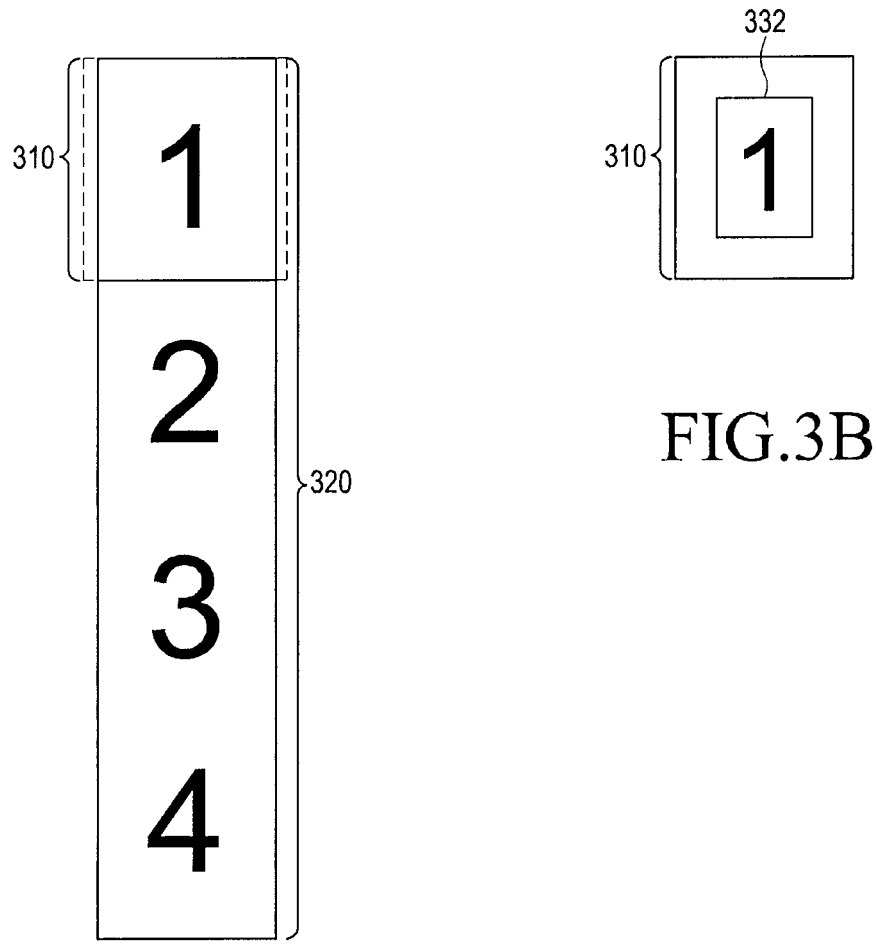
FIG. 3A, FIG. 3B, FIG. 3C, FIG. 3D, FIG. 3E, FIG. 3F, FIG. 3G and FIG. 3H illustrate an image file generating method according to various embodiments of the present disclosure.

Referring to FIG. 3A, the user device including a screen 310 may provide a page 320 larger than the screen 310. When there is a screen capture request while the page 320 is searched, a capture image may be generated by capturing an image displayed on the screen 310.

Referring to FIG. 3B, an image including at least a part of the currently captured image may be provided to the user in a form of a preview image or a thumbnail 332. Alternatively, a menu for making a request for a continuous screen capture may be provided without the provision of the thumbnail. When there is a selection of a particular menu or there is no input by the user within a preset time, the user device may generate an image file by using the capture image.

Figure 3C:
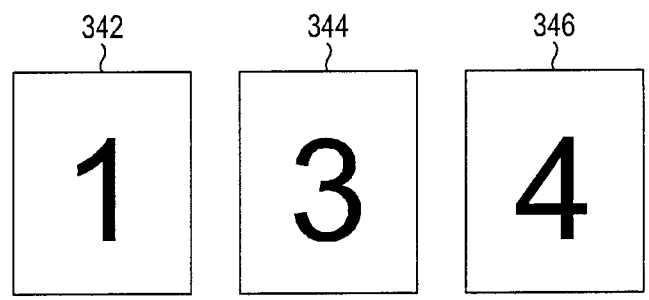
Figure 3D:
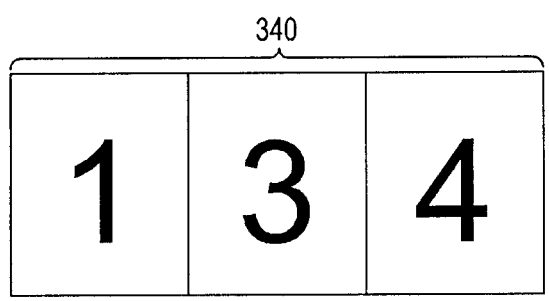
Figure 3E:
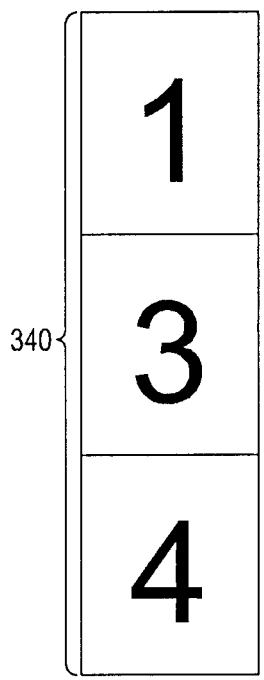

When a plurality of capture images 342, 344, and 346 are generated according to the request for the continuous screen capture as illustrated in FIG. 3C, the user device may generate an image file 340 by combining the plurality of generated capture images as illustrated in FIG. 3D or 3E.

Figure 3F:
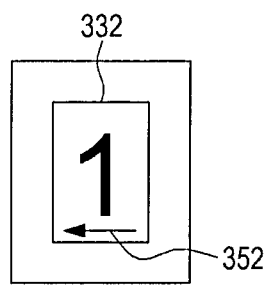
Figure 3G:
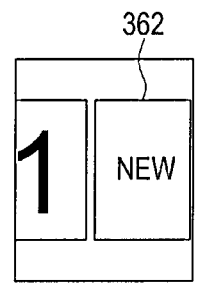

In one example, when the user device recognizes the user's request for the continuous screen capture, for example, a user's input of performing a swipe 352 for a capture image provided in a form of the thumbnail 332 as illustrated in FIG. 3F, the user device may provide an interface of informing the user that a screen capture expansion is possible. For example, as illustrated in FIG. 3G, an interface 362 of informing that a new capture image can be generated may be displayed.

In various embodiments, an opposite direction of the swipe action by the user, for example, a direction in which the interface 362 is displayed may indicate a position a new capture image to be combined with the previously generated capture image. For example, when the swipe action 352 is performed in a left direction, a next capture image may be combined at a right side 362 of the previous capture image 332 as illustrated in FIG. 3G. In contrast, when the swipe action is performed in a right direction, a next capture image may be combined at a left side of the previous capture image.

Figure 3H:
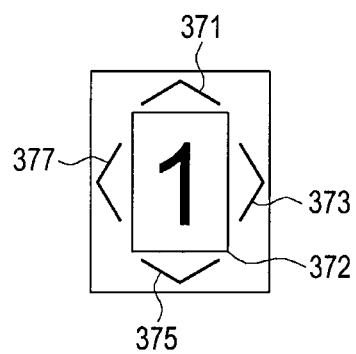

In one example, when a user's action of selecting one side of the capture image provided in the thumbnail form is recognized instead of the swipe action, the user device may provide an interface of informing the user that a screen capture expansion is possible. Accordingly, the user device may display an interface of informing that a new capture image can be generated in at least one side of the capture image in the thumbnail form. For example, the user device may display one or more indicators 371, 373, 375, and 377 around the image in the form of the thumbnail 372 as illustrated in FIG. 3H. When the user selects one indicator 371, the user device determines that there is the request for the continuous screen capture, and may display the interface 362 of informing that the screen capture expansion is possible as illustrated in FIG. 3G. Like the above described embodiment, when one indicator is selected, a direction in which the selected indicator is located may indicate a position of a new capture image to be combined with the previous capture image.

In one example, when generating an image file, the user device may generate the image file not to repeatedly include an overlapping area. Various embodiments will be described with reference to related drawings.

In one example, the preview image or the thumbnail may not be provided.

In one embodiment, a screen capture request input may include an input of combining one or a plurality of hardware keys. Alternatively, the screen capture request input may include an input of combining one or a plurality of software keys. Alternatively, the screen capture request input may include a particular gesture input. Alternatively, the screen capture request input may include an input of performing a combination based on at least one of the above inputs.

In one example, an additional image may be acquired based on the screen capture request input.

Figure 4:
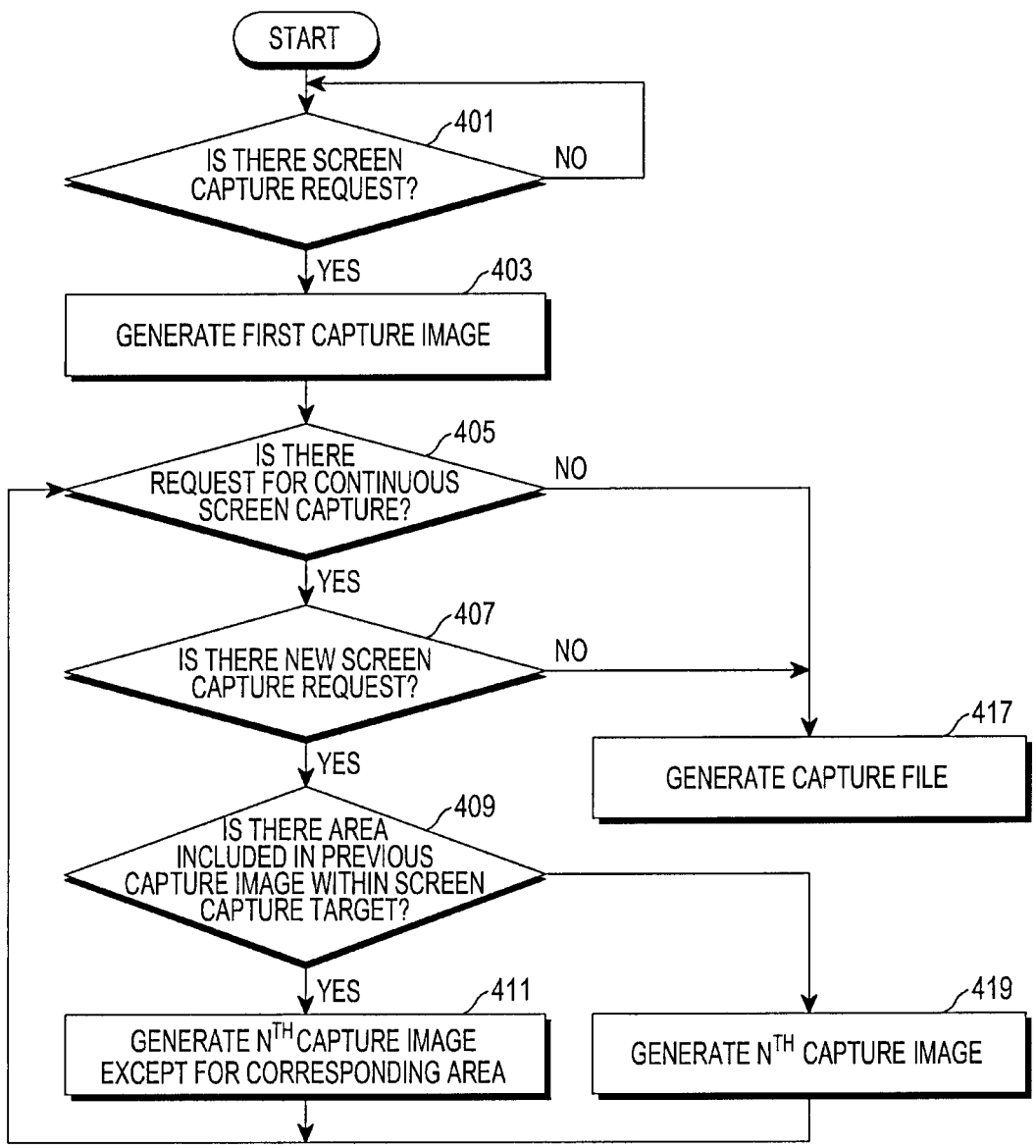
FIG. 4 illustrates an image file generating method according to various embodiments of the present disclosure.

FIG. 4 illustrates an image file generating method according to various embodiments of the present disclosure.

Since steps 401 to 407 and 417 are the same as steps 201 to 207 and 217 of FIG. 2, detailed descriptions thereof will be omitted.

When there is a new screen capture request, the user device determines whether there is an area included in the previous capture image in an area which is a target of the current screen capture in step 409. When it is determined that there is the area included in the previous capture image in the area which is the target of the current screen capture, the user device proceeds to step 411. Otherwise, the user device proceeds to step 419.

In step 411 performed by the determination that there is the area included in the previous capture image in the area which is the target of the current screen capture, the user device generates an $N^{th}$ capture image except for the area included in the previous capture image.

In step 419 performed by the determination that there is no area included in the previous capture image in the area which is the target of the current screen capture, the user device generates an $N^{th}$ capture image by using the area which is the target of the current screen capture.

FIG. 5 illustrates an image file generating method according to various embodiments of the present disclosure.

Figures 5A, 5B:
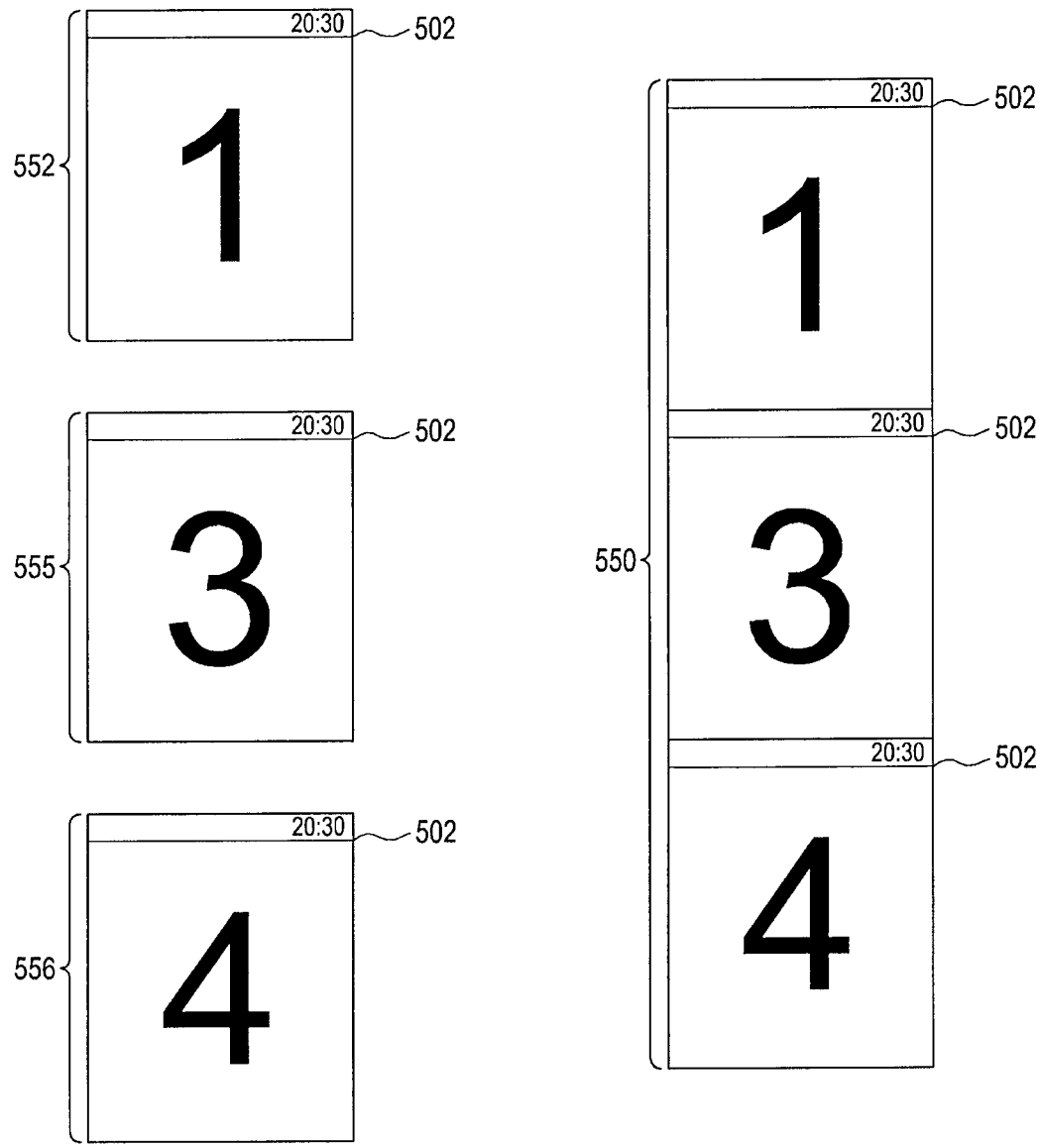
FIG. 5A and FIG. 5B illustrate an image file generating method according to various embodiments of the present disclosure.

For example, when the screen capture is performed in a state where an indicator bar or at least one of fixedly repeated areas is designated as a target of the screen capture (the designation may be set by default or set by the user through a selection of a set menu), capture images 552, 554, and 556 including an indicator bar 502 are generated whenever the screen is captured as illustrated in FIG. 5A. When the capture images 552, 554, and 556 are directly combined, an image file 550 including a plurality of indicator bars 502 is generated as illustrated in FIG. 5B. The image file 550 including the plurality of image bars 502 makes the user who views the image file 550 uncomfortable. In some embodiments, the user device may generate an image file such that only one indicator bar 502 is displayed.

For example, the user device determines whether there is a capture area overlapping first to N-lth capture images when performing the screen capture to generate the $N^{th}$ capture image. This is done based on image position detection using coordinates with respect to a reference position within a scrollable screen image enabling detection of overlapped portions in different screen images as described later. Alternatively, detection of overlap areas is performed by recognizing duplicate image objects by determining at least a portion of an outline of an object based on pixel luminance transition (as known) and matching like objects in different captured images. In response to identification of an overlap area between 2 captured images, when it is determined that there is the overlapping capture area, the user device may generate the $N^{th}$ capture image except for the overlapping capture area.

FIGS. 6A to 6F illustrate an image file generating method according to various embodiments of the present disclosure.

Figure 6A:
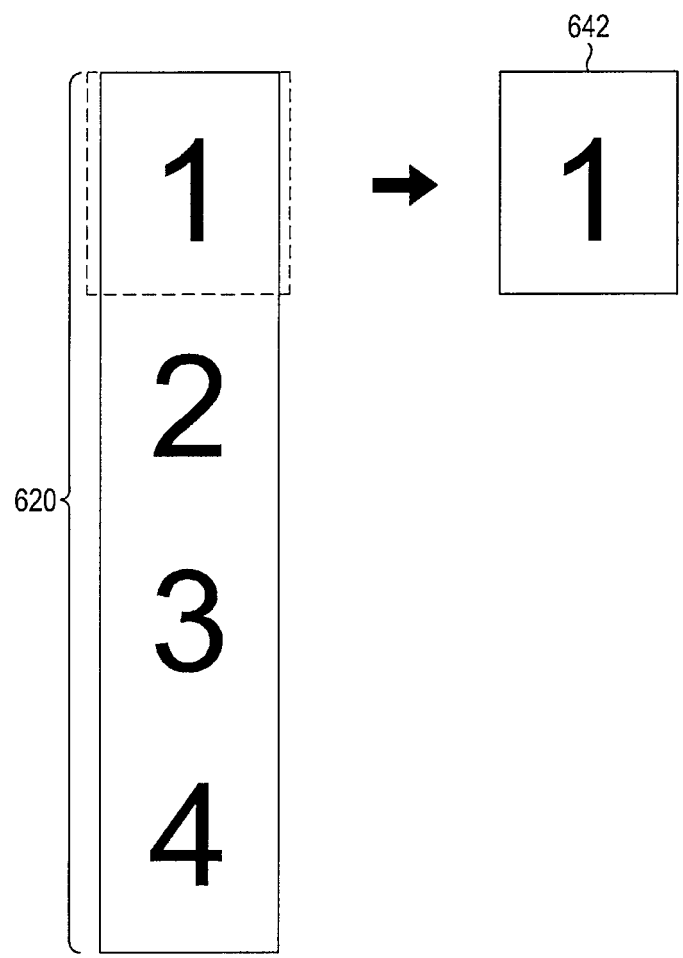
FIG. 6A, FIG. 6B, FIG. 6C, FIG. 6D, FIG. 6E and FIG. 6F illustrate an image file generating method according to various embodiments of the present disclosure.
Figure 6B:
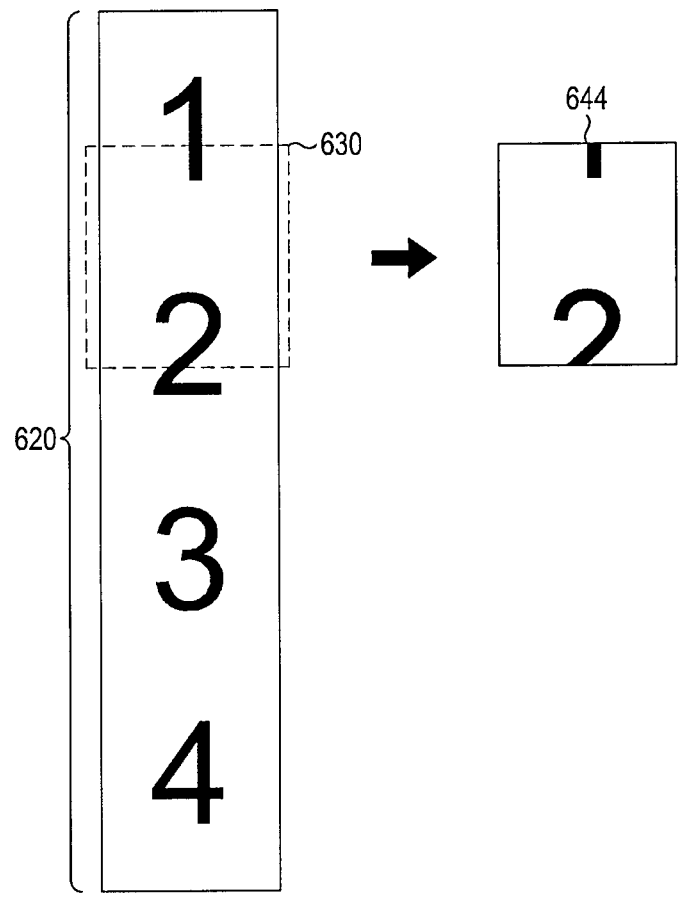
Figure 6C:
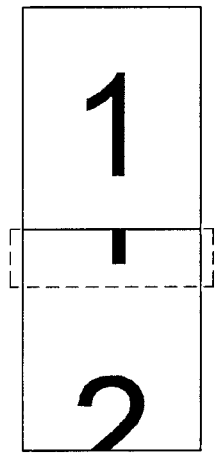

For example, it is assumed that a capture image 642 is generated by performing a screen capture from a long page 620 as illustrated in FIG. 6A and a capture image 644 is generated by performing a scroll function and then performing a screen capture from the scrolled page as illustrated in FIG. 6B. If an image file is generated using the capture images 642 and 644, a size of the image file unnecessarily becomes large and the user who views the image file feels uncomfortable due to the overlapping captured area as illustrated in FIG. 6C.

Accordingly, the user device may determine whether there is an area overlapping the previous capture area in every capture and generate a capture image by using the remaining areas except for the overlapping area. For example, when the capture image 642 as illustrated in FIG. 6A is generated and then the capture is performed for the area 630 as illustrated in FIG. 6B, the user device may determine whether there is an area overlapping the previously generated capture image 642 in the area 630 which is a target of the capture. For example, the determination may use information coordinates on the page (for example, information on X and Y coordinates).

Figure 6D:
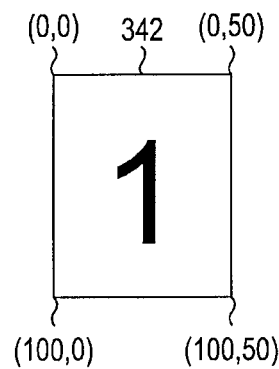
Figure 6E:
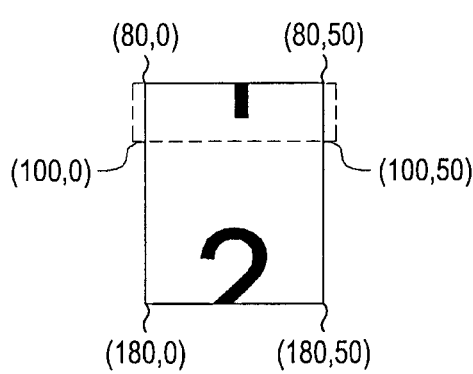
Figure 6F:

For example, as illustrated in FIG. 6D, it is assumed that coordinates of a target area for generating the capture image are (0, 0) and (100, 50) and coordinates of a target area for generating a new capture image are (80, 0) and (180, 50). In this case, the coordinates ranging from (80, 0) to (100, 50) are the overlapping area. In this event, the user device may generate the new capture image by using an area except for an area corresponding to the coordinates (80, 0) to (100, 50), for example, an area corresponding to the coordinates (100, 0) to (180, 50), as illustrated in FIG. 6 E. As illustrated in FIG. 6F, an image file having no overlapping capture area can be generated.

In various embodiments of the present disclosure, it is possible to display an already captured area in a preset way to inform the user that the corresponding area is the already capture area. It will be described with reference to FIGS. 7A to 7C.

Figure 7A:
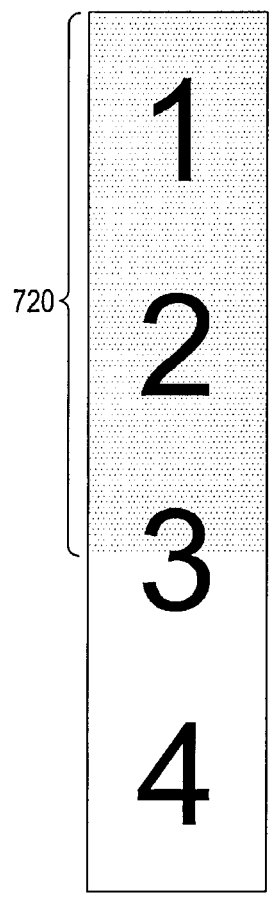
FIG. 7A, FIG. 7B and FIG. 7C illustrate an image area guiding method according to various embodiments of the present disclosure.
Figure 7B:
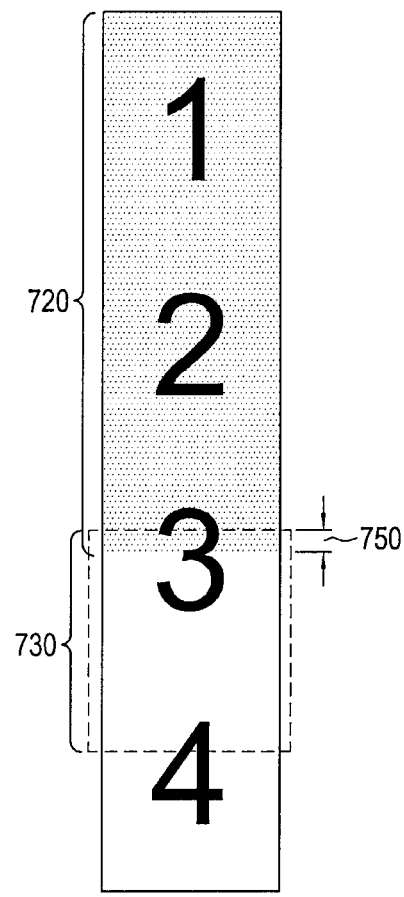
Figure 7C:
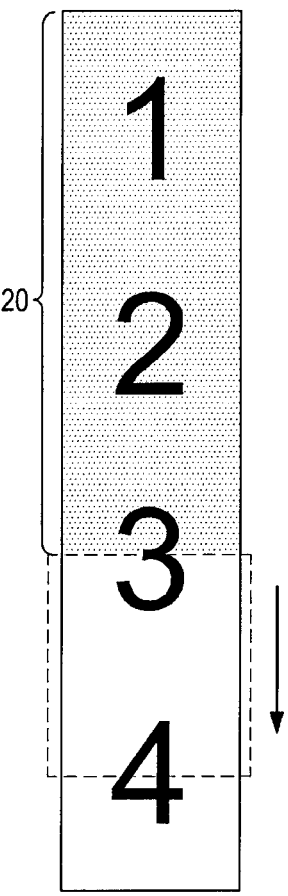

FIGS. 7A to 7C illustrate an image area guiding method according to various embodiments of the present disclosure.

For example, as illustrated in FIG. 7A, the user device may shade a screen-captured area 720 and display the shaded area 720. The user can make the already captured area not overlappingly captured while viewing the displayed screen.

In various embodiments of the present disclosure, the user device may provide a magnet guide. For example, the magnet guide may be used for preventing an area included in the previously generated capture image from being overlappingly included in the new capture image. For example, when there is a request for capturing an area continuous to a previously captured area 720 as illustrated in FIG. 7, if a currently displayed area 730 includes a set area corresponding to a part 750 of the previously generated capture image, the user device may make the corresponding area 750 not included in the current capture by performing an automatic scroll as illustrated in FIG. 7C.

In the above description, the screen capture method performed in one document, for example, one web page has been discussed, but various embodiments of the present disclosure are equally applicable to a case where the screen capture is performed in one or more documents. According to various embodiments of the present disclosure, the screen capture may be performed by interworking different applications. For example, an image file may be generated by performing a screen capture from one application, performing a screen capture from another application, and then combining capture images thereof.

In various embodiments of the present disclosure, the generated image file may do not exceed a set capacity of size (pixel). It may be achieved by, for example, identifying a capacity or size of a canvas for generating the image file.

For example, the user may secure a canvas for storing a newly generated capture image whenever there is a request for a continuous screen capture. When it is determined that a capacity or size of the secured canvas exceeds a preset threshold, the user device may resize each capture image. It will be described with reference to FIGS. 8A to 8C.

Figure 8A:
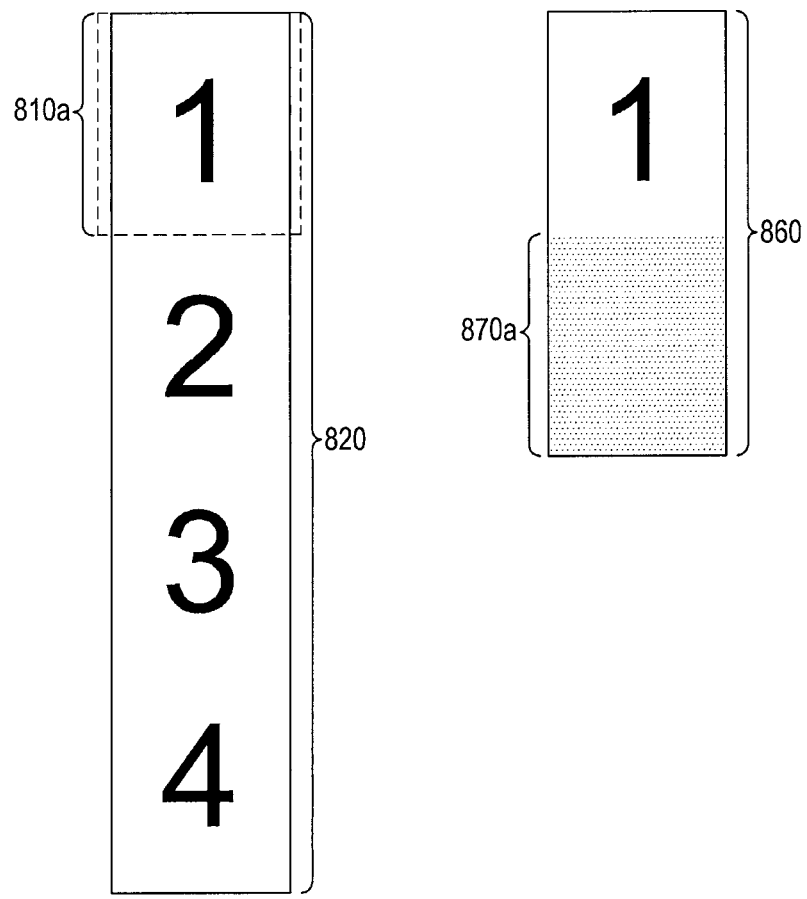
FIG. 8A, FIG. 8B and FIG. 8C illustrate an image resizing method according to various embodiments of the present disclosure.
Figure 8B:
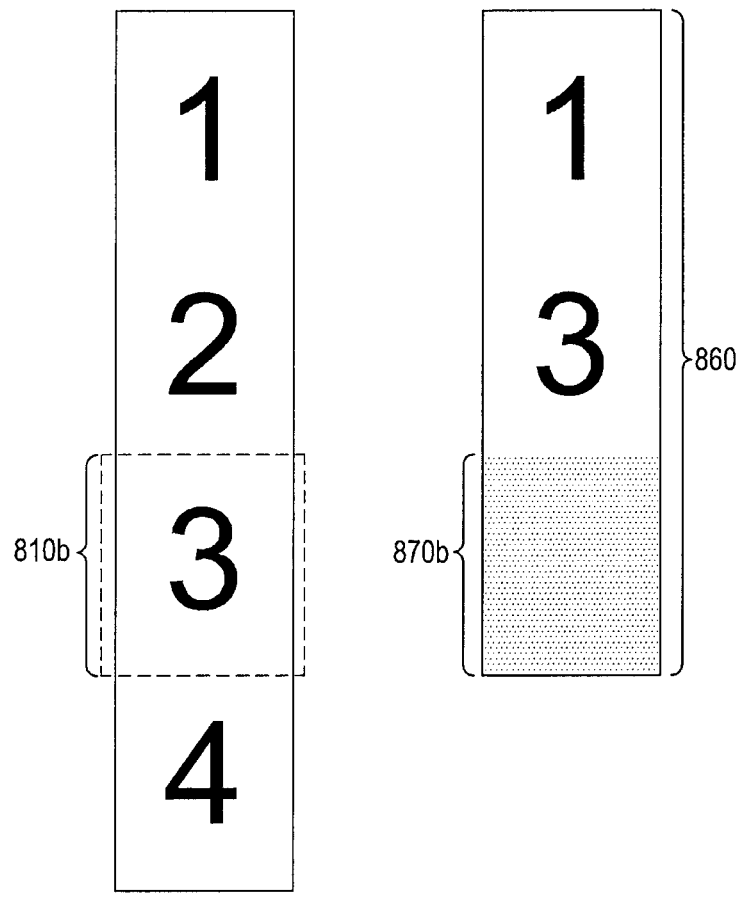
Figure 8C:
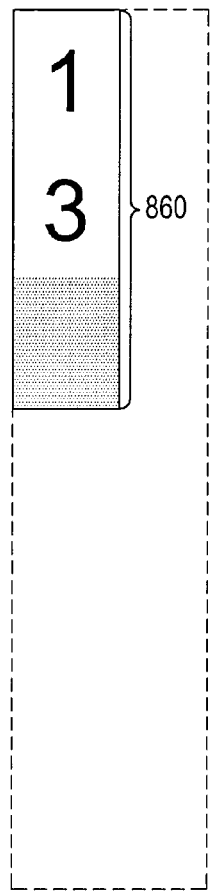

FIGS. 8A to 8C illustrate an image resizing method according to various embodiments of the present disclosure.

When there is a request for a screen capture of an area 810a from a page 820 as illustrated in FIG. 8A, the user device may acquire a capture image including the corresponding area 810a and store the acquired capture image in a predetermined memory space, for example, a canvas 860. Further, the user device may secure a canvas area 870a for a new capture image. The secured canvas area 870a may be determined based on a preset value or a capacity or size of the previously generated capture image.

When there is a request for a screen capture of an area 810b from a page 810 as illustrated in FIG. 8B, the user device may acquire a capture image including the corresponding area 810b and store the acquired capture image in the canvas 860. Similarly, the user device may secure a canvas area 870b for a new capture image.

When the canvas for storing the capture image is secured, the user device may determine whether a canvas capacity exceeds a preset capacity or size. When the canvas capacity exceeds the preset capacity or size, the user device may resize each capture image.

For example, it is determined that a size or capacity of the canvas 860 including the canvas area 870b as described in FIG. 8B exceeds a preset threshold, the user device may resize each capture image stored in the canvas 860 as illustrated in FIG. 8C.

In one example, when it is determined that the canvas capacity or size exceeds the preset threshold, the user device may provide the user with an interface of asking the user about whether to divide the image file. Further, the user device may divide the image file according to a selection by the user.

In one example, the generation of the image file may be continuously made. Hereinafter, the continuous generation of the image file is referred to as a scroll capture for the convenience of descriptions.

Figure 9:
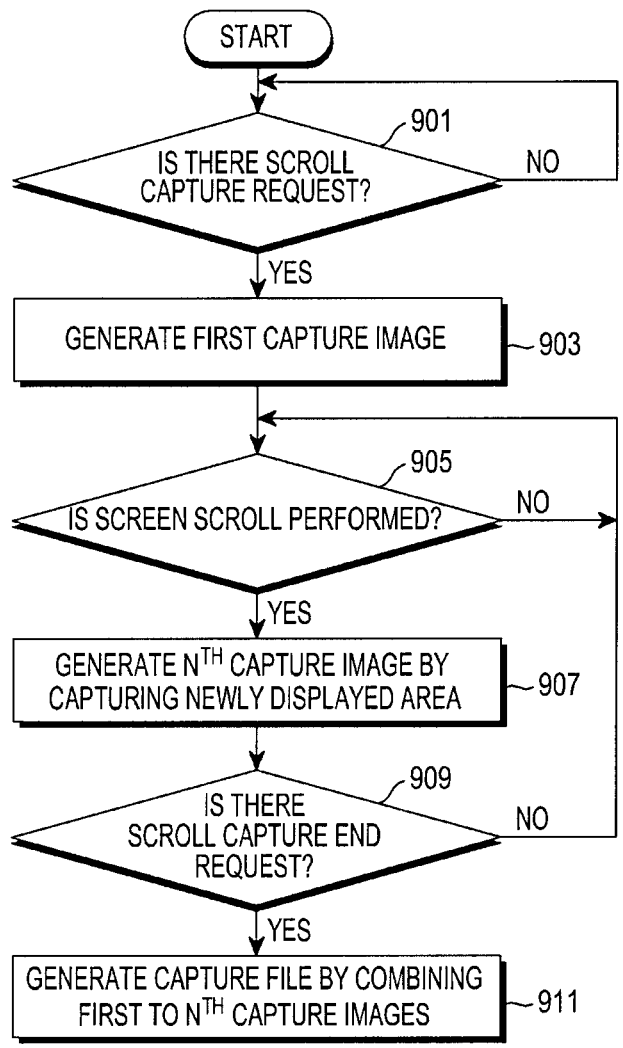
FIG. 9 illustrates a scroll capture method according to various embodiments of the present disclosure.

FIG. 9 illustrates a scroll capture method according to various embodiments of the present disclosure.

The user device determines whether there is a scroll capture request in step 901, and proceeds to step 903 when there is the scroll capture request. The scroll capture request may be made by selecting a set menu.

The user device generates an $N^{th}$ capture image in step 903, and then proceeds to step 905. A first capture image may be generated for a currently displayed area.

The user device determines whether a screen scroll is performed in step 905, and proceeds to step 907 when it is determined that the screen scroll is performed.

The user device generates the $N^{th}$ capture image by capturing a newly displayed area in step 907, and then proceeds to step 909. For example, when a new area corresponding to a set area is displayed through the screen scroll, the user device may generate the $N^{th}$ capture image.

In step 909, the user device determines whether there is a scroll capture end request. When it is determined that there is the scroll capture end request, the user device proceeds to step 911. Otherwise, the user device proceeds to step 905. The scroll capture end request may be made by selecting a set menu.

In step 911, the user device may generate one or more image files by combining first to $N^{th}$ capture images.

Figure 10:
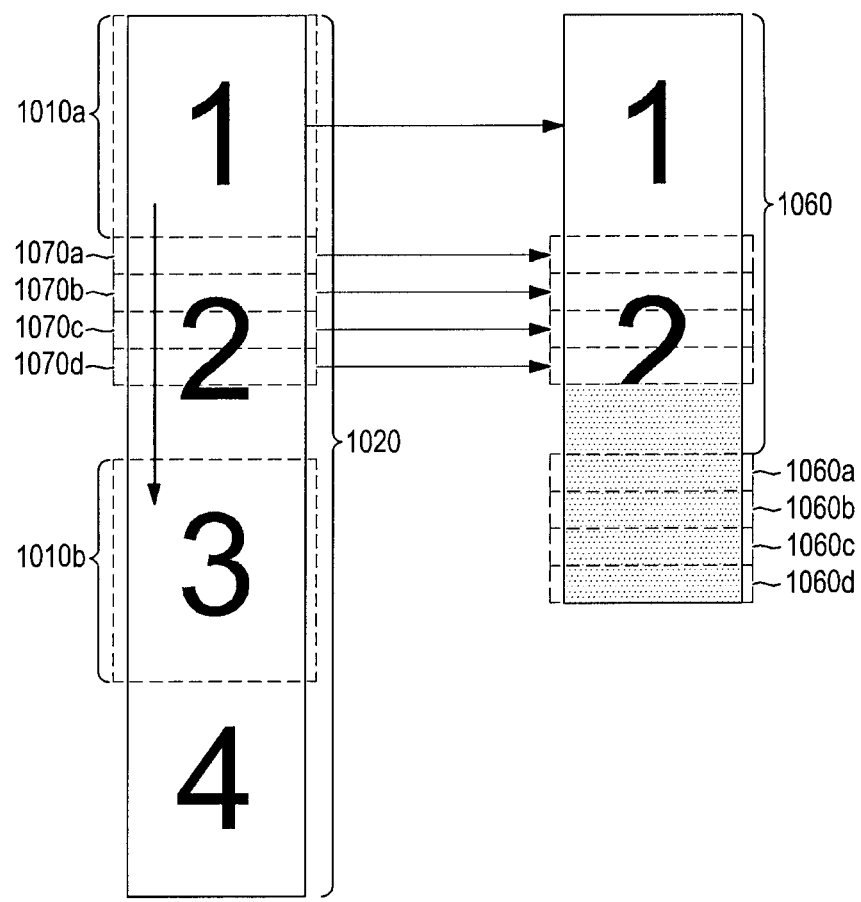
FIG. 10 illustrates a scroll capture method according to various embodiments of the present disclosure.

FIG. 10 illustrates a scroll capture method according to various embodiments of the present disclosure.

For example, when the user selects a particular menu for the scroll capture while searching a page 1020 as illustrated in FIG. 20, the user device may perform the screen capture for a currently displayed area 1010a. The generated capture image may be stored in a canvas 1060. Similar to the above described embodiments, the user device may secure a canvas for next capture images according to a scroll capture function. When the user performs the scroll, the user device may perform the screen capture of areas 1070a, 1070b, 1070c, and 1070d newly displayed on the screen and repeatedly perform an operation of moving capture images of the respective areas to the canvas.

In various embodiments of the present disclosure, whenever the newly displayed areas 1070a, 1070b, 1070c, and 1070d are larger than or equal to a threshold, the user device may perform the capture of the newly displayed areas 1070a, 1070b, 1070c, and 1070d to generate the $N^{th}$ capture image.

Similar to the above described embodiments, when a new capture image is generated, the user device may secure canvas areas 1060a, 1060b, 1060c, and 1060d for next capture images.

Thereafter, when there is a request for stopping the scroll capture by selecting a particular menu, the user device may combine the capture images moved to the canvas to generate one or more image files.

In various embodiments of the present disclosure, when there is a newly displayed area by a scroll performed in an opposite direction, it may be determined whether the corresponding area is an area stored in the canvas. When the corresponding area is the area stored in the canvas, the user device may not store the corresponding area in the canvas.

According to various embodiments of the present disclosure, it is possible to capture a long page without a plurality of controls for the screen capture.

According to various embodiments of the present disclosure, it is possible to acquire a capture image through an operation of selecting the area 1010a at which the user desires to start the screen capture and an operation of selecting the area 1010b at which the screen capture ends. For example, when information on coordinates (0, 0) and (100, 50) corresponding to the area 1010a is acquired and information on coordinates (380, 0) and (480, 50) corresponding to the area 1010b is acquired, an image corresponding to coordinates (0, 0) and (480, 50) can be acquired. FIGS. 11A to 11F illustrate an image file generating method according to various embodiments of the present disclosure.

Figure 11A:
FIG. 11A, FIG. 11B, FIG. 11C, FIG. 11D, FIG. 11E and FIG. 11F illustrate an image file generating method according to various embodiments of the present disclosure.
Figure 11B:
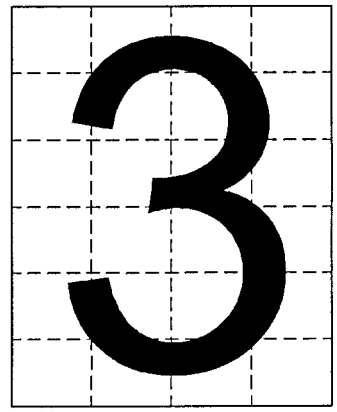

When there is a user's request for performing a partial capture in a display state illustrated in FIG. 11A, the user device may divide a display area into a plurality of sub areas and display guide lines guiding the corresponding sub areas as illustrated in FIG. 11B.

Figure 11C:
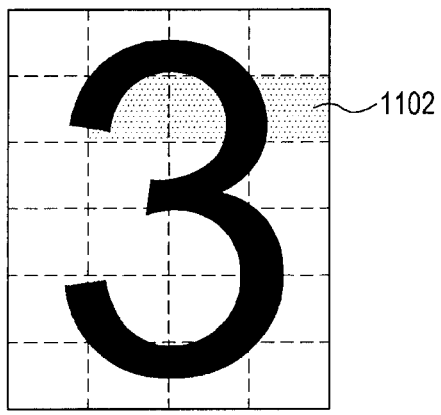
Figure 11D:
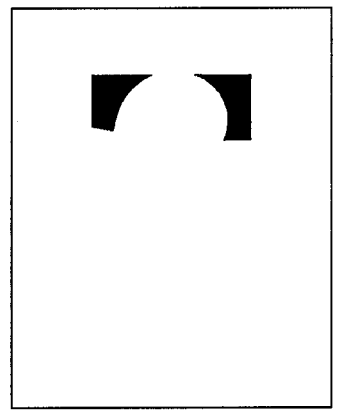
Figure 11E:
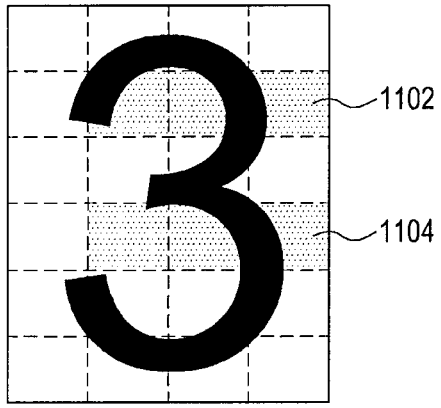
Figure 11F:
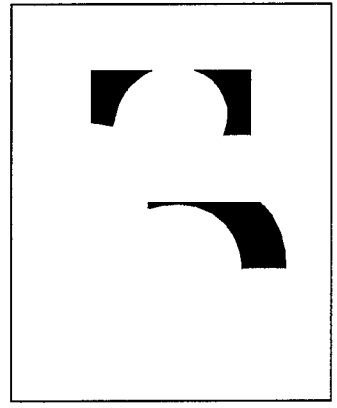

Thereafter, when the user selects at least one sub area as illustrated in FIGS. 11C and 11E, the user device may generate a capture image by performing a capture of the selected sub areas 1102 and 1104 and repeatedly perform an operation of storing the generated capture image in the canvas as illustrated in FIGS. 11D and 11F. The selection of at least one sub area by the user may be made by a touch or a touch and drag action.

According to an embodiment of the present disclosure, when there is a selection of at least one sub area, the user device may make the selected area distinguished from an area which has not been selected. For example, the user device may shade the selected area.

When there is a user's request for completing the partial capture after at least one sub area is selected, the user device may generate an image file by using the sub area stored in the canvas.

In the above description, the image file generating method according to various embodiments of the present disclosure has been discussed with reference to FIGS. 1 to 11. Hereinafter, a user device to which various embodiments of the present disclosure are applicable will be described with reference to related drawings.

According to various embodiments of the present disclosure, the image file generating method may include an operation of providing an electronic page (for example, 120, 320, 620, 820, or 1020) through an electronic device, an operation of acquiring a plurality of images (for example, 342, 344, 346, 552, 555, 556, 642, 644, 810a, and 810b) including at least a part of the electronic page based on a user's input, and an operation of generating an image file (for example, 340 or 550 of FIG. 6F, FIG. 11D, or FIG. 11F) including at least a first image or a second image of the plurality of images.

According to various embodiments of the present disclosure, the operation of acquiring the images may include an operation of determining whether to acquire an additional image based on the user's input (for example, input 352 or 372).

According to various embodiments of the present disclosure, the operation of acquiring the images may include an operation of displaying preview images 332 and 362 corresponding to the plurality of images.

According to various embodiments of the present disclosure, the operation of acquiring the images may include an operation of determining whether to acquire an additional image based on the preview images 332 and 362.

According to various embodiments of the present disclosure, the operation of acquiring the images may include an operation of acquiring a plurality of images such that the first image and the second image do not overlap each other.

According to various embodiments of the present disclosure, the operation of generating the image file may include an operation of determining a relative position of the first image and the second image based on the user's input.

According to various embodiments of the present disclosure, the operation of generating the image file may include an operation of combining the first image and the second image based on the relative positions.

According to various embodiments of the present disclosure, the operation of generating the image file may include an operation of generating the image file such that the plurality of images do not include an overlapping area.

According to various embodiments of the present disclosure, the operation of acquiring the images may include an operation of acquiring a plurality of images including at least a part (for example, 1070a, 1070b, 1070c, or 1070d) of an electronic page newly provided in accordance to a user's input of scrolling the electronic page. According to various embodiments of the present disclosure, the operation of acquiring the images may further include an operation of acquiring at least a part (for example, 1102 or 1104) of the plurality of images based on the user's input.

According to various embodiments of the present disclosure, the image file generating method may include an operation of generating a first capture image by performing a screen capture when there is a request for capturing a screen (for example, an electronic page), an operation of generating an $N^{th}$ capture image (N is a natural number larger than 1) by performing a new screen capture in response to a new screen capture request when there is the corresponding request, and an operation of generating one image file by combining at least a part of the first to $N^{th}$ capture images.

According to various embodiments of the present disclosure, the image file generating method may include an operation of generating a first capture image by capturing a screen (for example, an electronic page) when there is a scroll capture request, an operation of generating an $N^{th}$ capture image (N is a natural number larger than 1) by capturing areas 1070a, 1070b, 1070c, and 1070d newly displayed in accordance with a scroll, and an operation of generating one image file by combining at least a part of the first to $N^{th}$ capture images.

According to various embodiments of the present disclosure, the electronic page may include one or a plurality of electronic pages provided by one program.

According to various embodiments of the present disclosure, the electronic page may include one or a plurality of electronic pages provided by a plurality of programs.

Figure 12:
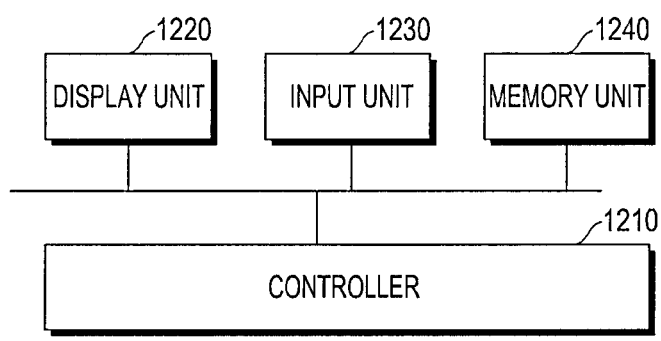
FIG. 12 illustrates a user device to which various embodiments of the present disclosure are applicable.

FIG. 12 illustrates a user device to which various embodiments of the present disclosure are applicable.

Referring to FIG. 12, a user device to which various embodiments of the present disclosure are applicable may include a controller 1210, a display unit 1220, an input unit 1230, and a memory unit 1240. At least one of the above components may be omitted.

The controller 1210 may generate a first capture image by performing a screen capture when there is a screen capture request. Whenever there is a new screen capture request, the controller 1210 may generate an $N^{th}$ capture image by performing a new screen capture corresponding to the new screen capture request. When there is an image file generating request, the controller 1210 may generate one or more image files by combining the first to $N^{th}$ capture images.

In one example, the controller 1210 determines whether there is a request for a continuous screen capture after the screen capture is performed. When there is the request for the continuous screen capture, the controller 1210 may secure a storage space for the screen capture.

In one example, the controller 1210 may display a currently generated capture image as a thumbnail having a preset size whenever the screen capture is performed. When there is a user's action of selecting one side of the thumbnail or swiping the thumbnail, the controller 1210 may determine that there is the request for the continuous screen capture. The controller 1210 determines an image combination direction in consideration of a direction in which the thumbnail is selected or the thumbnail is swiped and performs an image combination according to the determined image combination direction so as to generate the image file.

In one example, the controller 1210 determines whether there is a capture area overlapping previous capture images, for example, the first to N-lth capture images when performing the screen capture to generate the $N^{th}$ capture image. When it is determined that there is the overlapping capture area, the controller 1210 may generate the $N^{th}$ capture image except for the overlapping capture area.

In one example, the controller 1210 determines whether there is an overlapping capture area in the first to $N^{th}$ capture images in generating the image file. When there is the overlapping capture image, the controller 1210 may remove the overlapping capture area from at least one capture image and generate the image file.

In one example, the controller 1210 may generate the first capture image by performing a screen capture of a currently displayed area when there is a scroll capture request. The controller 1210 may generate the $N^{th}$ capture image by capturing a newly display area according to a user's action of scrolling the screen. The controller 1210 may generate one or more image files by combining the first to $N^{th}$ capture images. Whenever the newly displayed area is larger than or equal to a threshold, the controller 1210 may generate the $N^{th}$ capture image by capturing the newly displayed area.

In one example, when there is a partial capture request, the controller 1210 may divide a display area into a plurality of sub areas. The controller 1210 may display a guide indicating the divided sub areas. The controller 1210 may generate at least one capture image by capturing the sub area selected from the divided sub areas by the user. The controller 1210 may generate one or more image files by combining the generated capture images in accordance with positions of the selected sub areas.

The display unit 1220 may display the screen under a control of the controller 1210. The input unit 1230 may generate an input signal according to an input by the user and transmit the generated input signal to the controller 1210. The display unit 1220 and the input unit 1230 may be implemented by a touch screen.

The memory unit 1240 may store a capture image and an image file. The memory unit 1240 may store a canvas area for storing the capture image.

The embodiments of the present disclosure discussed in the above description may be implemented through various random methods. For example, various embodiments of the present disclosure may be implemented in software, hardware, or a combination thereof. When the various embodiments of the present disclosure are implemented in software, the software may be executed on one or more processors using various operating systems or platforms. Additionally, the software may be made using random one of a plurality of proper programming languages and also complied by an executable machine language or intermediate code executed in a framework or a virtual machine.

Further, when the various embodiments of the present disclosure are implemented on one or more processors, the various embodiments of the present disclosure may be implemented by a processor-readable medium (for example, a memory, a floppy disk, a hard disk, a compact disk, an optical disk, or an magnetic tape) recording one or more programs for performing the method implementing the various embodiments of the present disclosure discussed in the above description.

The above-described methods and apparatuses of the disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An apparatus for generating an image file, the apparatus comprising:
   a display;
   a processor; and
   memory including instructions that, when executed by the processor, cause the apparatus to:
   display, on the display, a first portion of an electronic page, without displaying a portion, other than the first portion, of the electronic page, wherein the electronic page includes other scrollable portion that is not currently displayed,
   in response to receiving a first user input for a screen capture while displaying the first portion, display, on the display, a thumbnail image of a captured image including the first portion and an user interface item for a scroll capture,
   in case that a second user input for the scroll capture on the user interface item is received, continuously scroll the electronic page, thereby display a second portion of the electronic page scrolled from the first portion;
   receive a third user input for ceasing the scroll capture while performing the scroll capture before scrolling to an end of the electronic page; and
   in response to receiving the third user input, generate a single image file, wherein the single image file comprises a single continuous portion of the electronic page that has displayed from when the first user input is received to when the third user input is received, and wherein the single continuous portion includes at least the first portion and the second portion,
   wherein the single continuous portion does not include a remaining portion of the electronic page, which is not scrolled based on the third user input.

2. The apparatus of claim 1, wherein when no user input is received within a preset time while displaying the thumbnail image, the single image file, generated by the screen capture, includes only the captured image.

3. A method of operating an apparatus, the method comprising:
   displaying, on a display included in the apparatus, a first portion of an electronic page, without displaying a portion, other than the first portion, of the electronic page, wherein the electronic page includes other scrollable portion that is not currently displayed,
   in response to receiving a first user input for a screen capture while displaying the first portion, displaying, on the display, a thumbnail image of a captured image including the first portion and a user interface item for a scroll capture,
   in case that a second user input for the scroll capture on the user interface item is received, continuously scrolling the electronic page, thereby displaying a second portion of the electronic page scrolled from the first portion;
   receive a third user input for ceasing the scroll capture while performing the scroll capture before scrolling to an end of the electronic page; and
   in response to receiving the third user input, generating a single image file, wherein the single image file comprises a single continuous portion of the electronic page that has displayed from when the first user input is received to when the third user input is received,
   wherein the single continuous portion includes at least the first portion and the second portion,
   wherein the single continuous portion does not include a remaining portion of the electronic page, which is not scrolled based on the third user input.

4. The method of claim 3, wherein when no user input is received within a preset time while displaying the thumbnail image, the single image file, generated by the screen capture, includes only the captured image.

5. A non-transitory computer-readable recording medium capable of storing a program for performing operations of an apparatus, the operations comprising:
   displaying, on a display included in the apparatus, a first portion of an electronic page, without displaying a portion, other than the first portion, of the electronic page, wherein the electronic page includes other scrollable portion that is not currently displayed,
   in response to receiving a first user input for a screen capture while displaying the first portion, displaying, on the display, a thumbnail image of a captured image including the first portion and a user interface item for a scroll capture,
   in case that a second user input for the scroll capture on the user interface item is received, continuously scrolling the electronic page, thereby displaying a second portion of the electronic page scrolled from the first portion;
   receive a third user input for ceasing the scroll capture while performing the scroll capture before scrolling to an end of the electronic page; and
   in response to receiving the third user input, generating a single image file, wherein the single image file comprises a single continuous portion of the electronic page that has displayed from when the first user input is received to when the third user input is received,
   wherein the single continuous portion includes at least the first portion and the second portion,
   wherein the single continuous portion does not include a remaining portion of the electronic page, which is not scrolled based on the third user input.

6. The non-transitory computer-readable recording medium of claim 5, wherein when no user input is received within a preset time while displaying the thumbnail image, the single image file, generated by the screen capture, includes only the captured image.

7. The apparatus of claim 1, wherein the instructions, when executed by the processor, cause the apparatus to:
   identify a relative position of the portion of the electronic page until the third user input is received.

8. The apparatus of claim 1, wherein the instructions, when executed by the processor, cause the apparatus to:
   acquire the portion of the electronic page until the third user input is received such that the single continuous portion do not repeatedly includes identical portions.

9. The apparatus of claim 1, wherein the single continuous portion of the electronic page included in the image file exclude an area displaying a key to which a return function to a home screen or a back function is assigned.

10. The apparatus of claim 1, wherein the first user input for the screen capture includes an input of combining one or more hardware keys.

11. The method of claim 3, wherein generating the single image file comprises:
    identifying a relative position of the portion of the electronic page until the third user input is received.

12. The method of claim 3, wherein generating the single image file comprises:
- acquiring the portion of the electronic page until the third user input is received such that the single continuous portion do not repeatedly includes identical portions.

13. The method of claim 3, wherein the single continuous portion of the electronic page included in the single image file exclude an area displaying a key to which a return function to a home screen or a back function is assigned.

14. The method of claim 3, wherein the first user input for the screen capture includes an input of combining one or more hardware keys.

15. The non-transitory computer-readable recording medium of claim 5, wherein the operations comprise:
- identifying a relative position of the portion of the electronic page until the third user input is received.

16. The non-transitory computer-readable recording medium of claim 5, wherein the single continuous portion of the electronic page included in the single image file exclude an area displaying a key to which a return function to a home screen or a back function is assigned.

17. The non-transitory computer-readable recording medium of claim 5, wherein the first user input for the screen capture includes an input of combining one or more hardware keys.

* * * * *